(12) United States Patent
Issa

(10) Patent No.: US 9,098,554 B2
(45) Date of Patent: Aug. 4, 2015

(54) SYNDICATION FEEDS FOR PEER COMPUTER DEVICES AND PEER NETWORKS

(71) Applicant: Qurio Holdings, Inc., Raleigh, NC (US)

(72) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

(21) Appl. No.: 14/194,849

(22) Filed: Mar. 3, 2014

(65) Prior Publication Data

US 2014/0181142 A1 Jun. 26, 2014

Related U.S. Application Data

(62) Division of application No. 11/189,141, filed on Jul. 25, 2005, now Pat. No. 8,688,801.

(51) Int. Cl.
*G06F 15/16* (2006.01)
*G06F 17/30* (2006.01)
*H04L 29/08* (2006.01)

(52) U.S. Cl.
CPC .... *G06F 17/30545* (2013.01); *G06F 17/30864* (2013.01); *G06F 17/30873* (2013.01); *H04L 67/02* (2013.01); *H04L 67/104* (2013.01); *H04L 67/1063* (2013.01); *H04L 67/26* (2013.01); *H04L 67/28* (2013.01); *H04L 67/2842* (2013.01); *H04L 67/2861* (2013.01); *H04L 67/04* (2013.01)

(58) Field of Classification Search
CPC .............. G06F 17/30545; G06F 17/30873; G06F 17/30864; H04L 67/02; H04L 67/04; H04L 67/26; H04L 67/28; H04L 67/104; H04L 67/2861; H04L 67/1063; H04L 67/2842

USPC ................ 709/217, 219, 218, 225; 707/770
See application file for complete search history.

(56) References Cited

U.S. PATENT DOCUMENTS

| 5,414,455 | A | 5/1995 | Hooper et al. |
| 5,915,252 | A | 6/1999 | Misheski et al. |
| 5,918,013 | A | 6/1999 | Mighdoll et al. |
| 6,073,168 | A | 6/2000 | Mighdoll et al. |
| 6,292,835 | B1 | 9/2001 | Huang et al. |

(Continued)

FOREIGN PATENT DOCUMENTS

| JP | 2003341150 A | 12/2003 |
| WO | 2005/099165 A2 | 10/2005 |

(Continued)

OTHER PUBLICATIONS

Allan, Rob et al., "Portals and Portlets 2003," CCLRC e-Science Center, Apr. 14, 2004, 40 pages.

(Continued)

*Primary Examiner* — Oleg Survillo
(74) *Attorney, Agent, or Firm* — Withrow & Terranova, PLLC

(57) ABSTRACT

Syndication feeds for peer computer devices. In one aspect, a request is received at a server for a syndicated feed from a peer on a peer-to-peer network. It is determined whether the peer is currently online or offline; if online, the requested feed is pulled from the peer and served to the requestor, and if offline, the requested feed is retrieved from a cache of the server and served to the requestor. In one embodiment, an online/offline indicator is inserted in a feed by the server to indicate to the user the online or offline status.

5 Claims, 8 Drawing Sheets

(56) References Cited

U.S. PATENT DOCUMENTS

| | | | |
|---|---|---|---|
| 6,330,606 B1 | 12/2001 | Logue et al. | |
| 6,349,336 B1 | 2/2002 | Sit et al. | |
| 6,449,657 B2 | 9/2002 | Stanbach, Jr. et al. | |
| 6,463,508 B1 | 10/2002 | Wolf et al. | |
| 6,487,538 B1 | 11/2002 | Gupta et al. | |
| 6,490,615 B1 | 12/2002 | Dias et al. | |
| 6,553,409 B1 | 4/2003 | Zhang et al. | |
| 6,564,218 B1 | 5/2003 | Roth | |
| 6,571,239 B1 | 5/2003 | Cole et al. | |
| 6,622,168 B1 | 9/2003 | Datta | |
| 6,631,369 B1 | 10/2003 | Meyerzon et al. | |
| 6,633,850 B1 | 10/2003 | Gabbard et al. | |
| 6,646,754 B1 | 11/2003 | Redd et al. | |
| 6,651,141 B2 | 11/2003 | Adrangi | |
| 6,658,463 B1 | 12/2003 | Dillon et al. | |
| 6,697,850 B1 | 2/2004 | Saunders | |
| 6,754,699 B2 | 6/2004 | Swildens et al. | |
| 6,757,684 B2 | 6/2004 | Svendsen et al. | |
| 6,757,705 B1 | 6/2004 | Pardikar et al. | |
| 6,859,807 B1 | 2/2005 | Knight et al. | |
| 6,891,635 B2 | 5/2005 | Dutta | |
| 6,917,965 B2 | 7/2005 | Gupta et al. | |
| 6,925,485 B1 | 8/2005 | Wang et al. | |
| 6,934,735 B1 | 8/2005 | Emens et al. | |
| 6,944,651 B2 | 9/2005 | Onyon et al. | |
| 6,954,752 B2 | 10/2005 | Iyengar | |
| 7,027,513 B2 | 4/2006 | Zhang et al. | |
| 7,039,784 B1 | 5/2006 | Chen et al. | |
| 7,043,644 B2 | 5/2006 | DeBruine | |
| 7,089,301 B1 | 8/2006 | Labio et al. | |
| 7,092,699 B1 | 8/2006 | Hefter | |
| 7,181,438 B1 | 2/2007 | Szabo | |
| 7,272,645 B2 | 9/2007 | Chang et al. | |
| 7,552,220 B2 | 6/2009 | Marmigere et al. | |
| 7,587,446 B1 | 9/2009 | Onyon et al. | |
| 7,698,386 B2 | 4/2010 | Amidon et al. | |
| 7,719,971 B1 | 5/2010 | Issa | |
| 2001/0039520 A1 | 11/2001 | Nakade et al. | |
| 2001/0052997 A1 | 12/2001 | Satake et al. | |
| 2002/0016839 A1* | 2/2002 | Smith et al. | 709/224 |
| 2002/0023143 A1 | 2/2002 | Stephenson et al. | |
| 2002/0023230 A1 | 2/2002 | Bolnick et al. | |
| 2002/0046262 A1 | 4/2002 | Heilig et al. | |
| 2002/0062384 A1 | 5/2002 | Tso | |
| 2002/0065879 A1 | 5/2002 | Ambrose et al. | |
| 2002/0078134 A1 | 6/2002 | Stone et al. | |
| 2002/0103998 A1 | 8/2002 | DeBruine | |
| 2002/0107934 A1 | 8/2002 | Lowery et al. | |
| 2002/0109729 A1 | 8/2002 | Dutta | |
| 2002/0133601 A1 | 9/2002 | Kennamer et al. | |
| 2002/0138744 A1 | 9/2002 | Schleicher et al. | |
| 2002/0178261 A1 | 11/2002 | Chang et al. | |
| 2002/0188602 A1 | 12/2002 | Stubler et al. | |
| 2002/0194590 A1 | 12/2002 | Pong | |
| 2003/0001903 A1 | 1/2003 | Duffy | |
| 2003/0005035 A1 | 1/2003 | Rodgers | |
| 2003/0009538 A1 | 1/2003 | Shah et al. | |
| 2003/0018639 A1 | 1/2003 | Iyengar | |
| 2003/0046586 A1 | 3/2003 | Bheemarasetti et al. | |
| 2003/0050863 A1 | 3/2003 | Radwin | |
| 2003/0061272 A1 | 3/2003 | Krishnamurthy et al. | |
| 2003/0063770 A1 | 4/2003 | Svendsen et al. | |
| 2003/0063771 A1 | 4/2003 | Morris et al. | |
| 2003/0069968 A1 | 4/2003 | O'Neil et al. | |
| 2003/0084162 A1 | 5/2003 | Johnson et al. | |
| 2003/0105812 A1 | 6/2003 | Flowers, Jr. et al. | |
| 2003/0112823 A1 | 6/2003 | Collins et al. | |
| 2003/0154306 A1 | 8/2003 | Perry | |
| 2003/0191832 A1 | 10/2003 | Satyavolu et al. | |
| 2003/0195940 A1 | 10/2003 | Basu et al. | |
| 2003/0225885 A1 | 12/2003 | Rochberger et al. | |
| 2003/0236831 A1 | 12/2003 | Ortiz et al. | |
| 2003/0236832 A1 | 12/2003 | McIntyre et al. | |
| 2004/0003117 A1 | 1/2004 | McCoy et al. | |
| 2004/0024828 A1 | 2/2004 | Miyagi et al. | |
| 2004/0044894 A1 | 3/2004 | Lofgren et al. | |
| 2004/0054860 A1 | 3/2004 | Dixit et al. | |
| 2004/0064512 A1 | 4/2004 | Arora et al. | |
| 2004/0064568 A1 | 4/2004 | Arora et al. | |
| 2004/0064693 A1 | 4/2004 | Pabla et al. | |
| 2004/0070678 A1 | 4/2004 | Toyama et al. | |
| 2004/0088348 A1 | 5/2004 | Yeager et al. | |
| 2004/0098447 A1 | 5/2004 | Verbeke et al. | |
| 2004/0117258 A1 | 6/2004 | Kanbara | |
| 2004/0128324 A1* | 7/2004 | Sheynman et al. | 707/200 |
| 2004/0139172 A1 | 7/2004 | Svendsen et al. | |
| 2004/0139227 A1 | 7/2004 | Takeda | |
| 2004/0148434 A1 | 7/2004 | Matsubara et al. | |
| 2004/0162871 A1 | 8/2004 | Pabla et al. | |
| 2004/0183831 A1* | 9/2004 | Ritchy et al. | 345/762 |
| 2004/0215523 A1 | 10/2004 | Wulff et al. | |
| 2004/0215625 A1 | 10/2004 | Svendsen et al. | |
| 2004/0215721 A1* | 10/2004 | Szeto et al. | 709/204 |
| 2005/0066063 A1 | 3/2005 | Grigorovitch et al. | |
| 2005/0071496 A1 | 3/2005 | Singal et al. | |
| 2005/0086386 A1 | 4/2005 | Shen et al. | |
| 2005/0091160 A1 | 4/2005 | Kitze et al. | |
| 2005/0091220 A1 | 4/2005 | Klemow | |
| 2005/0097085 A1 | 5/2005 | Shen et al. | |
| 2005/0114711 A1 | 5/2005 | Hesselink et al. | |
| 2005/0114757 A1 | 5/2005 | Sahota et al. | |
| 2005/0119910 A1* | 6/2005 | Schneider | 705/1 |
| 2005/0138176 A1 | 6/2005 | Singh et al. | |
| 2005/0147044 A1 | 7/2005 | Tedosiu et al. | |
| 2005/0160167 A1 | 7/2005 | Cheng et al. | |
| 2005/0171864 A1 | 8/2005 | Nakade et al. | |
| 2005/0193083 A1 | 9/2005 | Han et al. | |
| 2005/0198125 A1 | 9/2005 | Macleod Beck et al. | |
| 2005/0198191 A1 | 9/2005 | Carlson et al. | |
| 2005/0198195 A1* | 9/2005 | Bowser et al. | 709/217 |
| 2005/0229243 A1 | 10/2005 | Svendsen et al. | |
| 2005/0246634 A1 | 11/2005 | Ortwein et al. | |
| 2005/0267973 A1 | 12/2005 | Carlson et al. | |
| 2006/0004691 A1 | 1/2006 | Sifry | |
| 2006/0010225 A1 | 1/2006 | Issa | |
| 2006/0064716 A1 | 3/2006 | Sull et al. | |
| 2006/0075336 A1* | 4/2006 | Gawor et al. | 715/530 |
| 2006/0136551 A1 | 6/2006 | Amidon et al. | |
| 2006/0155698 A1* | 7/2006 | Vayssiere | 707/6 |
| 2006/0173985 A1 | 8/2006 | Moore | |
| 2006/0218275 A1 | 9/2006 | Labio et al. | |
| 2006/0230021 A1* | 10/2006 | Diab et al. | 707/3 |
| 2006/0242238 A1 | 10/2006 | Issa | |
| 2006/0294396 A1* | 12/2006 | Witman et al. | 713/189 |
| 2007/0180075 A1 | 8/2007 | Chasman et al. | |
| 2007/0271380 A1 | 11/2007 | Chang et al. | |
| 2010/0169465 A1 | 7/2010 | Amidon et al. | |
| 2010/0211677 A1 | 8/2010 | Issa | |

FOREIGN PATENT DOCUMENTS

| | | | |
|---|---|---|---|
| WO | 2006/026193 A2 | 3/2006 | |
| WO | 2006/055535 A2 | 5/2006 | |

OTHER PUBLICATIONS

Author Unknown, "High Definition: A-Z Guide to Personal Technology", CredoReference Definitions, Retrieved Jul. 18, 2011, 2 pages, http://www.credoreference.com/entrv/hmhiqhdef/cache.

Fielding, R., et al., "Hypertext Transfer Protocol—HTTP/1.1," Request for Comments (RFC) 2616, Internet Engineering Task Force (IETF) Network Working Group, Jun. 1999, 114 pages, http://tools.ietf.org/pdf/rfc2616.pdf.

Fielding, R., et al., "Hypertext Transfer Protocol—HTTP/1.1," Request for Comments (RFC) 2068, Internet Engineering Task Force (IETF) Network Working Group, Jan. 1997, 136 pages, http://tools.ietf.org/pdf/rfc2068.pdf.

Lerner, Reuven, "At the Forge: Aggregating with Atom," Linux Journal, vol. 2004, No. 127, Copyright: 2004, 7 pages.

Lerner, Reuven, "At the Forge: Syndication with RSS," Linux Journal, vol. 2004, No. 126, Copyright: 2004, 9 pages.

Lerner, Reuven, "At the Forge: Bloglines Web Services," Linux Journal, vol. 2005, No. 129, Copyright: 2005, 6 pages.

(56) References Cited

OTHER PUBLICATIONS

Lerner, Reuven, "At the Forge: Aggregating Syndication Feeds," Linux Journal, vol. 2004, No. 128, Copyright: 2004, 7 pages.

Lerner, Reuven, "At the Forge: Bloglines Web Services, Continued," Linux Journal, vol. 2005, No. 131, Copyright: 2005, 7 pages.

Parker, Jason, "An Easy Way to Share Digital Photos with Others," ZDNet Anchor Desk Editorial Feature, Jun. 13, 2003, 1 page, http://reviews-zdnet.com.

Raymond, Scott, "Broadcatching with Bittorrent," Scottraymond.net, Dec. 16, 2003, 3 pages, http://web.archive.org/web/20040213093750/http://scottraymond.net/archive/4745.

Sandler, Dan et al., "Sharing Web Micrownews with Peer-to-Peer Event Notification," FeedTree: PowerPoint Presentation, Feb. 24, 2005, 20 pages, Rice University.

Lee, Sung-Ju et al., "An Interactive Video Delivery and Caching System Using Video Summarization," Computer Communications, vol. 25, No. 4, Mar. 2002, 9 pages.

Author Unknown, "Broadcatching," Wikipedia—The Free Encyclopedia, Modified Feb. 17, 2008, 3 pages, http://en.wikipedia.org/wiki/Broadcatching.

Author Unknown, "Welcome!," The Apache Software Foundation, Retrieved May 22, 2006, 2 pages, http://www.apache.org/.

Author Unknown, "Squid Web Proxy Cache," Squid Cache, May 22, 2006, 1 page, http://www.squid-cache.org/.

International Search Report and Written Opinion for PCT/US06/27953, mailed Apr. 3, 2008, 18 pages.

Non-Final Office Action for U.S. Appl. No. 11/189,141, mailed Mar. 21, 2008, 16 pages.

Final Office Action for U.S. Appl. No. 11/189,141, mailed Sep. 2, 2008, 18 pages.

Non-Final Office Action for U.S. Appl. No. 11/189,141, mailed Mar. 11, 2009, 17 pages.

Advisory Action for U.S. Appl. No. 11/189,141, mailed Nov. 18, 2008, 3 pages.

Final Office Action for U.S. Appl. No. 11/189,141, mailed Aug. 25, 2009, 19 pages.

Advisory Action for U.S. Appl. No. 11/189,141, mailed Nov. 3, 2009, 3 pages.

Examiner's Answer to Appeal Brief for U.S. Appl. No. 11/189,141, mailed Jun. 15, 2010, 21 pages.

Patent Board Decision on Appeal for U.S. Appl. No. 11/189,141, mailed Apr. 29, 2013, 5 pages.

Notice of Allowance and Examiner-Initiated Interview Summary for U.S. Appl. No. 11/189,141, mailed Jul. 12, 2013, 10 pages.

Non-Final Office Action for U.S. Appl. No. 11/189,141, mailed Aug. 27, 2013, 18 pages.

Notice of Allowance for U.S. Appl. No. 11/189,141, mailed Nov. 21, 2013, 10 pages.

First Office Action for Chinese Patent Application No. 201210202337.1 issued Feb. 2, 2015, 23 pages.

\* cited by examiner

SYNDICATION FEEDS FOR PEER COMPUTER DEVICES AND PEER NETWORKS

PRIORITY CLAIM

The present application is a divisional of U.S. patent application Ser. No. 11/189,141, entitled SYNDICATION FEEDS FOR PEER COMPUTER DEVICES AND PEER NETWORKS, which was filed on Jul. 25, 2005, which is incorporated by reference herein in its entirety for all purposes.

FIELD OF THE INVENTION

The present invention relates to syndication feeds over computer networks, and more particularly to syndication feeds used with peer computer devices and in peer networks.

BACKGROUND OF THE INVENTION

Peer-to-peer networks ("peer networks") allow computer devices of the network to act as peer nodes that are capable of communicating with other peer nodes in the peer network so that the peers can exchange data without having to go through a central server. For example, one use of peer networks is a photo sharing network, such QURIO™ provided by Flashpoint Technology, Inc., in which users can store images in web photo albums that guests are invited to view, download, or order prints. The use of peer networks to personally share photos from a user's personal computer or electronic device allows users to easily share pictures from their own computers or devices without the time-consuming process of uploading photos to a central server. Other types of content can also be shared using a peer network; for example, users can publish content such as text and documents, video, or audio files, such as MP3 files of music or speech.

One of the difficulties of having a large peer network is the inability to detect if there has been new content published on a favorite peer. It involves checking and rechecking to see if any content hosted on the peer is new, i.e., has not been downloaded or viewed by that user previously. If a guest has a large list of peers that he or she regularly checks, this can be time consuming and tedious. There currently exists no mechanism for a guest to browse new content published via a peer network without checking every single peer on the network. As more and more of produced electronic content is created and hosted closer to the producer of the content, it becomes more difficult for consumers of content to keep track of new content that is produced.

A recently popular trend in Internet and World Wide Web use is web syndication, which has been used by news and information organizations to distribute content over the Internet and other electronic mediums. Web syndication allows a website or a section of a website to be made available as "web feeds" for other websites to receive and distribute to users. Typically, the feeds are available from a central site so that any user can display or output a list of content referred to by the feed. The content can be updated by the owner of the feed and the updates are automatically provided in the feed. Formats such as Extensible Markup Language (XML), JavaScript, or Hypertext Markup Language (HTML) can be used to encode content that is syndicated. Web content syndication formats, such as Really Simple Syndication (RSS) or ATOM can be used to structure XML-based content for syndication, for example. These syndication technologies have also been used by weblogs or "blogs" (i.e., online journals and the like) as a way of syndicating content of the blogs to several readers.

The syndication technology allows a reader to scan the syndicated feed of several blogs to look for new or interesting content that the reader may be interested in reading more about. Typically, a syndicated feed reader or aggregator is used to scan feeds for new content.

However, syndicated feeds are not available for peer networks. One reason is because peers are not always available due to users shutting down peer computers or other conditions, and thus feeds served by those peers would not always be available. Thus, content sharing using feeds is provided using central-server-based networks, not peer networks. Content hosted by peers is therefore not provided for easy access to other users over networks.

Accordingly, there is a need for a method and system allowing user content provided from a peer in a peer network to be easily accessed, searched, and browsed by other users. The present invention addresses such a need.

SUMMARY OF THE INVENTION

The invention of the present application relates to syndication feeds for peer computer devices and peer networks. In one aspect of the invention, a method for providing syndicated feeds from peers of a peer-to-peer network includes receiving a request at a server for a syndicated feed from a peer on the peer-to-peer network, and determining whether the peer is currently online or offline. If the peer is currently online, the requested feed is pulled from the peer and served to the requestor. If the peer is currently offline, the requested feed is retrieved from a cache of the server and served to the requestor. A similar aspect of the invention provides a computer readable medium for implementing similar features.

In another aspect of the invention, a network system includes a plurality of peer computers, each peer computer capable of communicating with the other peer computers over a peer-to-peer network and generating a syndicated feed summarizing content stored on that peer computer. The system also includes a server capable of communication with each of the peer computers, where the server is configured to receive a request from a requestor for a particular syndicated feed provided by a particular one of the peer computers, determine whether the particular peer computer is currently online or offline, pull the particular feed from the peer and serve the particular feed to the requestor if the peer is currently online, and retrieve the requested feed from a cache of the server and serve the requested feed to the requestor if the peer is currently offline.

In another aspect of the invention, a method for distributing a syndicated feed from peers in a peer-to-peer network includes receiving a notification at a feed portal that a new feed has been generated on a peer in the peer-to-peer network, requesting the data for the new feed from a proxy server that is connected to the peer, receiving the new feed at the feed portal from the proxy server and storing the new feed in a database, and serving the new feed from the database when requested by a requestor connecting to the feed portal.

The present invention provides a method and system that allows a user to quickly and conveniently receive and review syndicated feeds for desired content that is hosted on peers in a peer network. Furthermore, the present invention can provide feeds for users even when the peer from which a feed is hosted is not currently online or available, thereby allowing increased feed availability to users of peer networks.

DETAILED DESCRIPTION

The present invention relates to syndication feeds over computer networks, and more particularly to syndication feeds used with peer computer devices and in peer networks. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

This patent application relates to the use of syndication standards and technology used to announce new peer content to interested parties and to aggregate feeds and content in a centralized site for browsing and searching. An efficient mechanism is described to make syndicated peer feeds explicitly and implicitly available to other users, such as guests.

Figure 1:
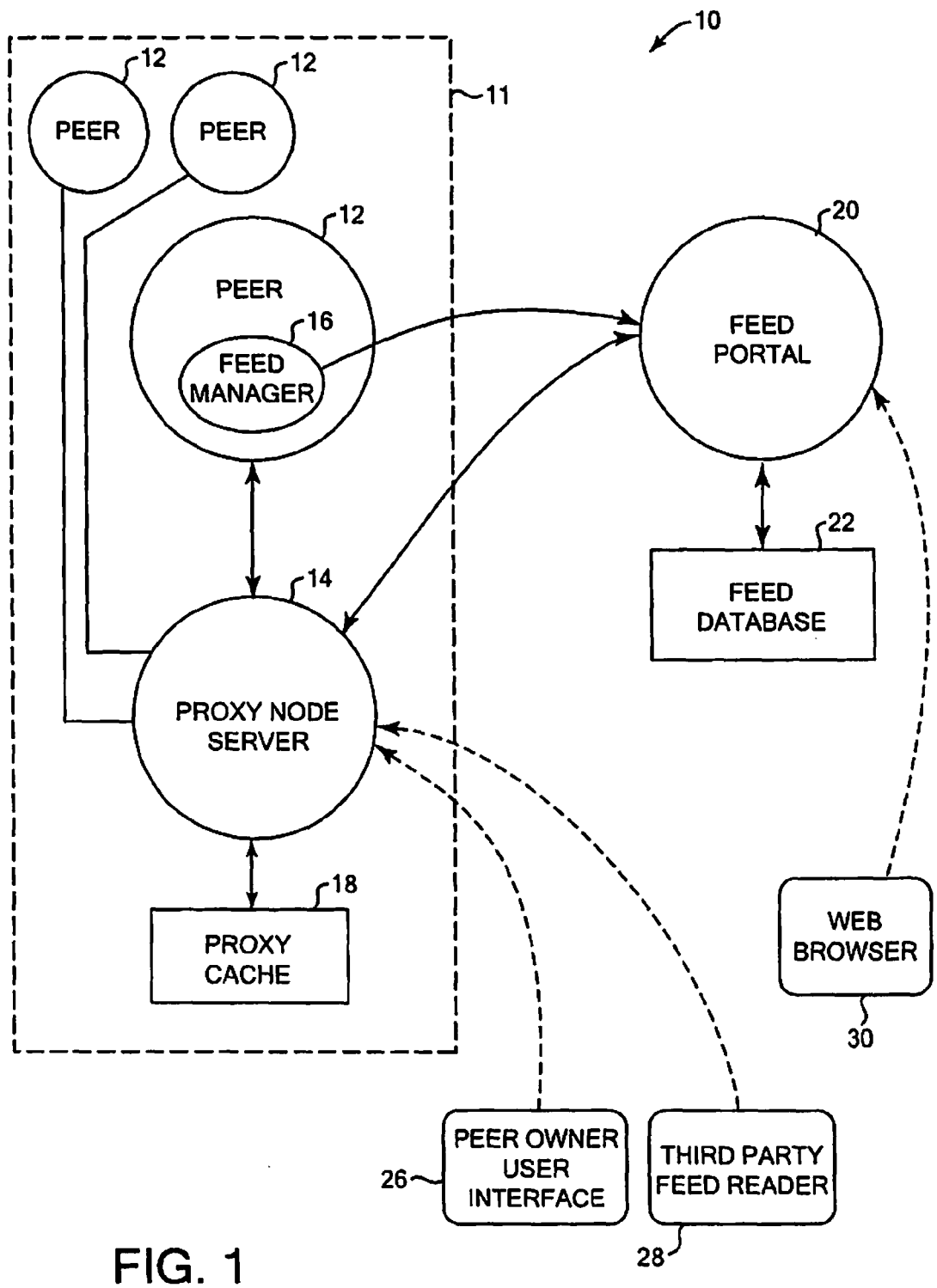
FIG. 1 is a block diagram illustrating an example of a network system suitable for use with the present invention.

FIG. 1 is a block diagram of an example of a network system 10 suitable for use with the present invention. System 10 includes a peer-to-peer network ("peer network") 11 that connects multiple peers 12 to each other to allow the sharing of content between the peers. Each peer 12 is a computer device that stores content such as images (photos), text documents, audio data, graphical data, or other content from users. A peer 12 can, for example, run peer node software and web server software that enable users of the peers to share content with other users of peers 12 of the peer network 11 without having to upload their content to a web site or other intermediary or central server on the network.

As described herein, the peer 12 (and any visiting or external computer outside the peer-to-peer network) can comprise any computing device with components necessary for executing the appropriate software, such as personal or desktop computers (PCs), workstations, laptop or other portable computers, cell phones, personal digital assistants (PDAs), etc. Peers 12 can include such components as a microprocessor, display screen, memory (RAM and/or ROM), interface components, storage devices (e.g., hard drives), printer devices, etc. Also, in a preferred embodiment, the peer-to-peer network uses the Internet, although any type of network can be used. The peers 12 can access the peer network 11 with any of a variety of connection types, including high-speed broadband, Ethernet, wireless IP, WiFi, GSM or other cell phone standards, etc.

The peer-to-peer sharing network 11 provides a hybrid peer-to-peer architecture and general HTTP/web browser configuration that incorporates a proxy node server 14 to coordinate network traffic between peers. The proxy node server 14 is a centrally-hosted computer system that is connected to all the peers 12 in the peer network 11. The proxy node server 14 can be connected to by any node on the peer network or the external network (such as the Internet outside the peer network). The proxy server can allow access to peers behind firewalls by other peers and by visiting or external computers not in the peer network 11. The proxy node server 14 also provides porting services to the peers as well as a path to which a visiting computer (one connected to the Internet or Web but not belonging to the peer network 11) also accesses content from the peers via, e.g., a web browser 30. The proxy server 14 can multiplex the Web traffic using a proprietary protocol to the peers, thus enabling generic web traffic to flow to the peers despite any presence of firewalls. The proxy server can act as a switchboard to receive and dispatch the incoming HTTP requests to the appropriate peers. An embodiment for implementing such communication between the proxy node server 14 and the peers 12 is described in copending patent application Ser. No. 10/813,839, filed Mar. 31, 2004, entitled "Method and System for Providing Web Browsing Through a Firewall in a Peer to Peer Network," and incorporated herein by reference.

The proxy node server 14 also can cache feeds and content from the peers 12 of the peer network according to the present invention. The proxy node server 14 can be operational continuously and always service peer feeds in accordance with one preferred embodiment. Peer feeds are described in greater detail below.

Each peer 12 can store content locally in a database or other data storage. For example, a peer 12 can store an online picture album, and the album (and images therein) can have metadata associated with it that describes and categorizes the album or images. The peer network 11 is in contrast to the traditional photo-sharing model where the user uploads images from a computer to a web server for storage in a static album on a central web site; instead, in the peer network 11, the peers 12 maintain storage of the actual image data (full content). Thus, all peers in the peer-to-peer network store content locally and act as servers to other users on that network.

In one embodiment, users become members of the peer network 11 (peer owners) by downloading and installing a peer node application that communicates with the proxy node server 14 and enables the user's computer to become a peer 12 in the peer network. Owners of the peers 12 can register themselves and their peer nodes with the proxy node server 14 to become members of the service so that other users can search for and view their content. The user can share content that is local on the owner's peer 12 by uploading the content metadata to a requesting peer via the proxy node server 14. A peer can connect to any peer via the proxy node server (to the user, it will appear as if it is a direct connection to another peer).

One method according to the present invention for allowing users to browse and search user content from peers is to use web syndication and web feeds, allowing the notification and summary of new content to be easily distributed to other users. New content is published by way of a new web feed which a guest or a community of guests or other peer owners or users may be interested in knowing about.

A feed provides a summary and categorization of the full content stored on the peer from which it is published. Thus, for example, a feed may include a thumbnail or small-sized version of a full picture stored on peer 12, or include a portion of text from a full document or portion of a full audio track stored on peer 12. The feed also can include a title for the content, as well as other descriptive information, as described below with respect to FIG. 2.

Each peer 12 is provided with a feed manager 16 which includes a component library that is part of the peer. The library generates a new or updated syndicated feed, using a well known standard such as Really Simple Syndication (RSS) or ATOM, or both, or using a proprietary standard. In some embodiments, there can be two types of feeds that are provided: a feed in a widely-used Internet-based XML syndication format, such as RSS and ATOM; and/or a feed in a proprietary XML format which supports "rich media" content, which includes such features as video, sound, or data and can use features such as user interaction, advanced animation (e.g., content in the form of Flash, Shockwave, Real Audio/Video, pull-down menus, search boxes, Java applets that allow for interactivity, and other types of special effects). If using a proprietary format, then the proxy server 14 and portal 20 are provided with the protocols needed to communicate using that format. Feeds in both types of XML formats essentially describe the content published by the peer in text or HTML, and can provide a link back to the full media content stored on the peer 12.

The updated feed can be generated whenever the peer owner (or user) publishes new content. For example, the peer owner can designate new content to be available to other users over the peer network 11 and/or over the entire network (Internet), thus publishing it. Or, the feed manager 16 can automatically check particular content locations on its peer 12 (e.g., particular directories), and compare the time of creation of the content in those locations with the last time that the feed manager generated a feed. If any of the content is newer than the last time a feed was generated, then the feed manager generates a new feed referring to that new content.

The proxy node server 14 accesses a feed published from peer 12 like other peer content. In the present invention, the proxy node server 14 receives and caches feeds from peers 12 in a proxy cache 18 that is implemented and maintained in the data storage of the server 14. The proxy server 14 can serve the cached version of a feed whenever the feed is subsequently requested, thereby reducing the load on the peer 12. If a user accessing a feed from the proxy server 14 then wishes to receive the online full content, the proxy server can then request that full content from peer 12 and serve that content to the requesting user. The full content can be selected by the user from a displayed list of feeds, for example, which is then downloaded to the user's peer 12 or third party syndicated reader directly from the peer that is hosting the online content for display. In some embodiments, users may then place orders with a commerce server for print creations (e.g., hard copies of prints) created from the selected content.

In an alternate embodiment, the proxy server can cache all the full content from the peer 12 (having received it previously from the peer) and serve that cached full content to the requestor instead of requesting it from the peer at the time of request. For example, a full content cache/server can be part of the proxy node server 14 or provided alongside the server 14.

A feed portal 20 can be used in conjunction with the peers 12 and proxy node server 14 to help serve feeds from peers 12. Portal 20 is a centrally hosted and managed web portal and aggregation server typically running on a server computer, which can be provided on any suitable computer system or electronic device. Portal 20 can be considered to be within the peer-to-peer network 11 in some embodiments, or in other embodiments, external to network 11. Portal 20 collects and stores peer feeds from peers 12 and can generate a listing of public peer content for browsing, which is accessible by users within and/or outside the peer network 11. Optionally, the portal 20 can provide some feeds as accessible only to peers in the peer network 11, and other feeds as accessible to all requestors or guests. The portal 20 can cache received feeds in a feed database 22 coupled to the portal.

The portal 20 also has a search engine and utility to allow users of the portal to search for feeds of interest to them, since metadata (and, e.g., a thumbnail image) for each content item is uploaded to the feed portal 14 to enable centralized searching. For example, users can enter search terms to find desired online content in feeds, and in response the portal 20 can display a list of summarized feeds and/or content, e.g., including thumbnail images for pictures or excerpts/portions of text, in the peer network that matches the search criteria.

Figure 6:
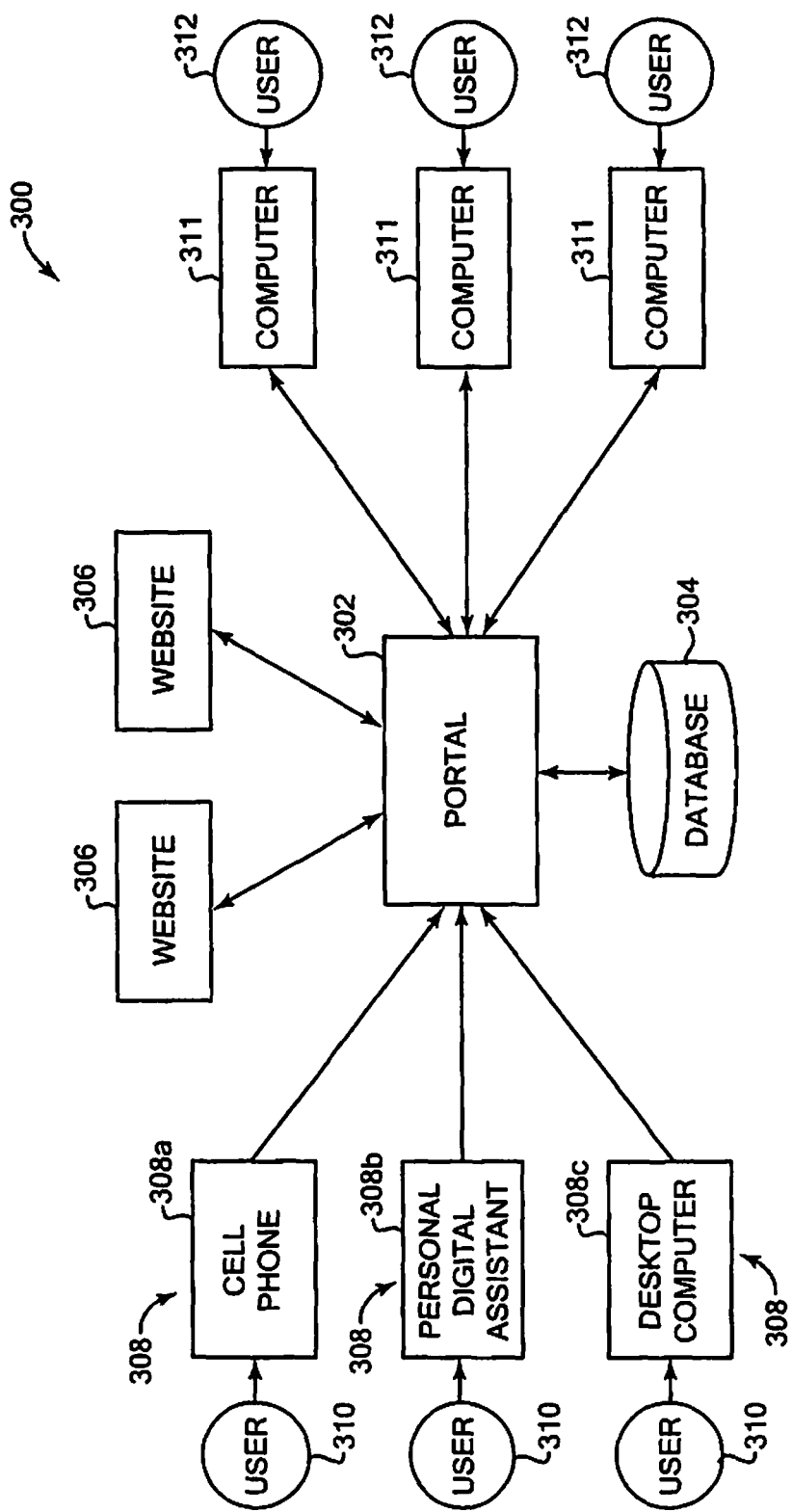
FIG. 6 is a block diagram illustrating another embodiment of the present invention in which user computer devices can directly provide feeds to a feed portal.

In a different embodiment, there is no proxy node server 14, and the feed portal 20 can cache peer syndicated feeds instead of the proxy server 14; this is described in greater detail with respect to FIGS. 6-78.

A peer owner user interface 26 can be associated with a feed reader provided on a peer computer within the peer network 11 and can be used to access peer feeds of peers 12 by the peer owner of the peer running the user interface 26. A peer owner can subscribe to feeds from other peers 12 by using a feed reader and user interface 26 that runs on the peer owner's computer. For example, the peer node software downloaded and running on a peer 12 which allows the peer to participate in the peer network can include a built-in feed reader and user interface 26 that allows the peer owner to subscribe to other peer feeds. The user interface 26 can access the feeds by connecting to the proxy node server 14, as any peer in the peer network to access content from other peers.

For example, the peer owner user interface 26 can include a built-in user interface reader component that allows the peer owner (i.e., any user of the user interface 26) to add a favorite peer to a stored list of favorite peers and be notified when there is new content on that peer. For example, the reader component can be labeled "Follow My Favorite Peers" or other title, and a directory of peers in the peer-to-peer network, or names of peer owners (e.g., in a "buddy list"), can be displayed from which the user may select to receive all feeds from those peers or users. Available feeds from each of those peers can also be displayed for user selection, if a user does not wish to receive all feeds from a peer. Transparently to the peer owner, the favorite peers of the peer owner can be polled by the user interface 26 via the proxy node server 14 and proxy cache 18 and the user interface 26, e.g., periodically or according to a desired user schedule. The user interface 26 indicates when there is new content which the user has not previously accessed or displayed. The user need not be aware that syndication technology is being used to obtain content from his or her favorite peers.

In the present invention, the user interface 26 can also display whether the hosting peer for each displayed feed is currently online or offline, thus indicating to the user whether the full content is currently available or not. This is described in greater detail below.

In some embodiments, a user may also be able to access the content feeds of the proxy node server 14 by using a third-party feed reader 28, which can be provided on a computer external to the peer network 11 (or alternately within the peer network 11). In such an embodiment, the feed manager 16 of a peer can generate standard feeds in a standard format, allowing third party feed readers to subscribe to the feeds and be notified when there is new content on the peer. For example, a third party RSS or ATOM reader such as SharpReader and FeedReader can be used; these readers allow the user to subscribe to a peer's ATOM or RSS content feed like any other news feed or blog feed. As an added efficiency to the peer 12, the feed reader 28 can connect to the proxy node server 14, i.e., the polling that the feed reader 28 performs is directly at the proxy node server 14 instead of the peer 12, and the proxy node server 14 provides the feeds from its cache 18. In the alternative embodiment in which there is no proxy node server 14, the feed portal 20 can cache the feed and the feed readers can access the feed via the feed portal 20.

In other embodiments, a proprietary feed reader application (rather than a standard feed reader application) can be downloaded to run on a computer of a user who does not own a peer in the peer-to-peer network, and that proprietary feed reader can allow the user to read feeds from the proxy node server 14 (or feed portal 20). Such a proprietary feed reader can function similarly to the user interface 26, described above.

Another way to access peer feeds is through the feed portal 20. The feed portal 20 stores feeds in its database 22 so that guests can access the feed via various methods. For example, any user external to the peer network 11 can browse the content feeds on feed portal 20, as the content feeds are generated, by using a web browser 30 that connects to the feed portal over the internet or other network. The portal 20 provides utilities to view the newest content added to the peer network 11, as well as utilities to allow browsing by content type and search of the feeds and content headers for desired content based on search criteria input by the user. For example, a user can use a web browser to search image album captions when looking for particular photo album content of interest to the user. In an alternate embodiment, an external or visiting user can subscribe to the peer feed in the absence of a proxy node server 14 and proxy cache, e.g., using a standard feed reader and connecting to the feed portal 20.

The proxy node server 14 and feed portal 20 are typically hosted on different servers in the peer network and external network. In an alternate embodiment, the server computer that hosts the proxy node server 14 can also host the feed portal 20. The functions of the feed portal 20 can be included in the proxy node server 14, or a separate, independent feed portal 20 can be implemented alongside the proxy node server 14 on the same server.

The present invention provides an efficient mechanism to make syndicated peer feeds explicitly and implicitly available to other users. An explicit feed is available to a third party reader, and an implicit feed is used transparently by systems like the feed portal 20.

Figure 2:
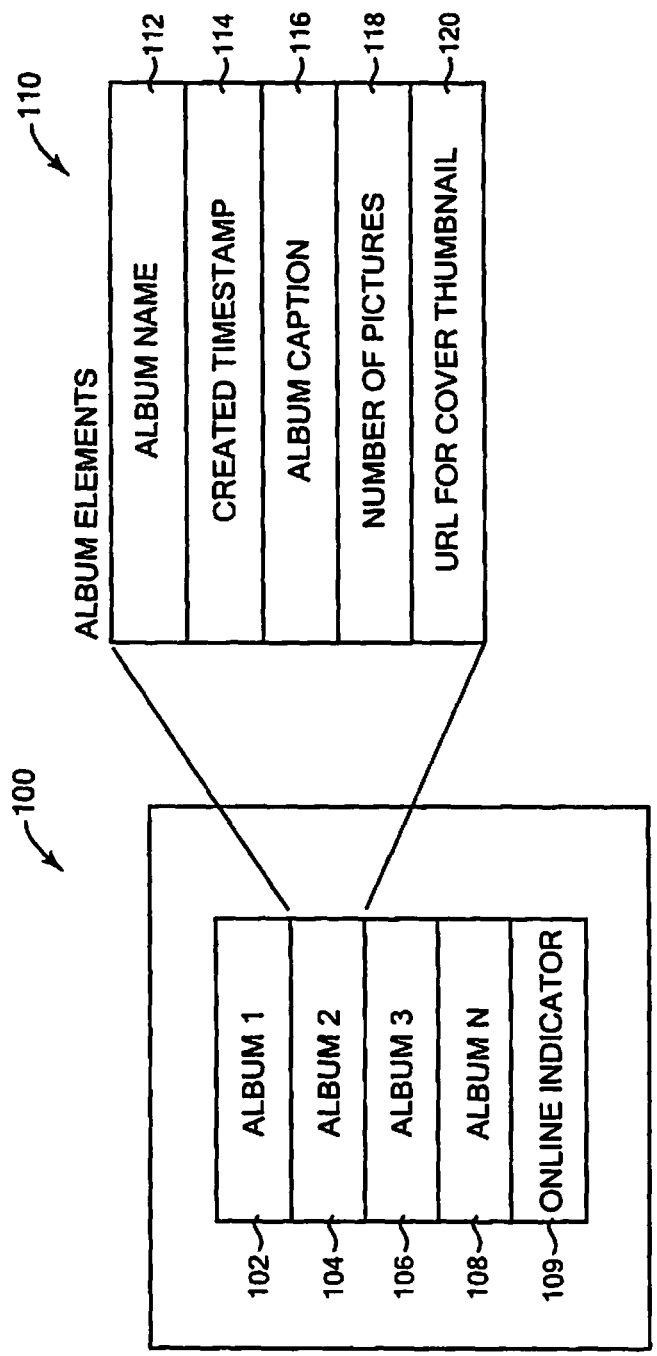
FIG. 2 is a diagrammatic illustrations of one example of a peer feed structure that can be used with the system of FIG. 1.

FIG. 2 is a diagrammatic illustration of one example 100 of a peer feed structure that can be used with the system of FIG. 1. The feed shown in the example of FIG. 2 pertains to image album content, in which a number of images are provided as content in each album. Other types of content can provide similar feed elements appropriate to the type of content.

The feed 100 includes feed content (feed information) for a number of photo albums 102, 104, 106, and 108. The feed content is partial content, i.e., a summarized or described version of the full content (stored on peer 12) of each album in the feed. In this example, each album 102, 104, 106, and 108 includes the elements 110, which in FIG. 2 are shown only for album 104. The elements can be formatted to conform to a specific syndication format.

Elements 110 include an album name 112, a created timestamp 114, an album caption 116, a number of pictures 118, and a URL 120 for a link and/or a cover thumbnail. The album name 112 provides the name assigned to the album e.g., by the album creator. The created timestamp 114 indicates when the album was created. The album caption 116 provides a short description of the contents of the album, as provided by the album creator, or an excerpt or portion from a longer description. The number of pictures 118 indicates how many pictures are grouped in that album.

The URL 120 is a link back to the full content referred to by the feed, typically stored on a peer 12 (or on a server in some embodiments). When the user selects the displayed link, the URL is followed to display the full pictures or other content, In some embodiments, a second URL (not shown) can also be provided in the feed, which provides the address for a cover thumbnail, i.e., the location where a thumbnail (smaller-sized) version of content is found and retrieved to be displayed when the feed is displayed. The thumbnail can be designated by the content creator to be representative of the full content referred to in the feed. For example, for photo content, the thumbnail is a smaller-sized version of a picture; for audio data, the thumbnail might be a small sample of the full audio content, etc. In other embodiments, no such second URL is provided in the feed; instead, the thumbnail data is itself stored in the feed as another feed element 110.

In other embodiments, additional or alternate elements can be included in a feed, such as text, a portion of audio data, time data describing other events (such as when the content is published via feed), or other data describing different content The feed 100 also includes an online indicator 109. This is an indicator inserted into the feed by the proxy node server 14 when serving the feed, to indicate to the user receiving the feed whether the peer hosting that feed is currently online or offline. This is described in greater detail below with respect to FIGS. 3A and 4.

Figure 3A:
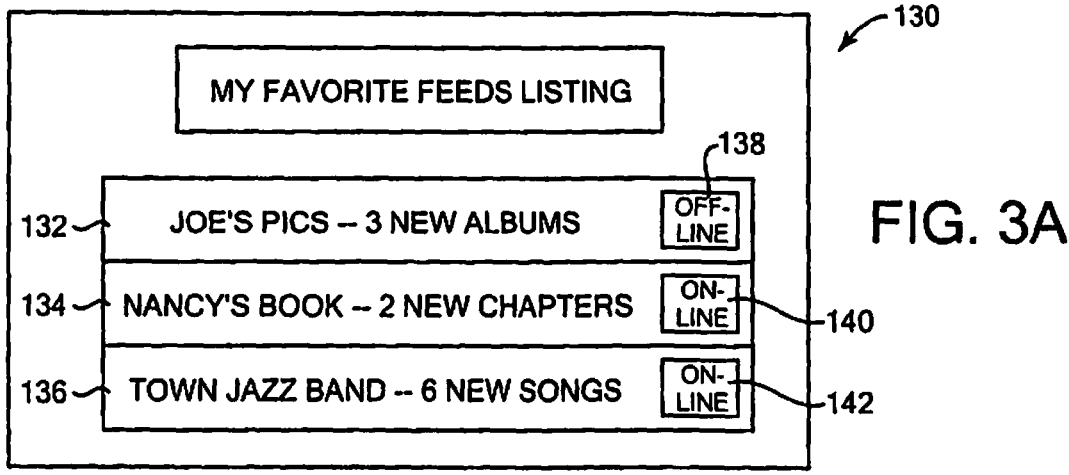
FIGS. 3A and 3B are diagrammatic illustrations of a examples of a listing of feeds displayed to a user, and a display of the feed content of a feed, respectively.

FIG. 3A is a diagrammatic illustration of an example of a listing 130 of feeds displayed in the user interface 26, feed reader 28, or web browser 30. This example shows feeds included in a "favorite feeds" listing which indicates to a user whether any new content has been published by users or peers previously designed by the user to be in the list.

The listing 130 includes feeds 132, 134, and 136 displayed as feed titles, each feed title being selectable by the user. With each feed title, the amount of new user content in that feed can also be displayed. For example, for feed 132, there is also displayed that there are three new photo albums in this feed. Content can be considered "new" if it was identified as new in the last check of the peer by its feed manager 16. Or, content can be identified as "new" if it has not yet been viewed by the particular user viewing the listing 130. Each feed can include elements similar to those described above with reference to FIG. 2, as described below with reference to FIG. 3B.

Each feed title can also be associated with an online indicator 138, 140, and 142, if the listing 130 is being viewed in user interface 26 or other compatible application. The indicator shows the user the current online or offline status of the peer that stores and publishes the feed displayed next to the indicator. Thus, the peer for feed 132 is shown as offline, while the peers for feeds 134 and 136 are shown as online. The user will be able to access the full content referenced by feeds of online peers, and will typically not be able to access the full content from offline peers (unless using an alternate embodiment). Other types of indicators can be displayed in other embodiments, such as an "X" symbol to indicate peer online (or offline) status, a title 132-136 displayed in a particular color such as red to indicate peer offline status, etc.

Figure 3B:
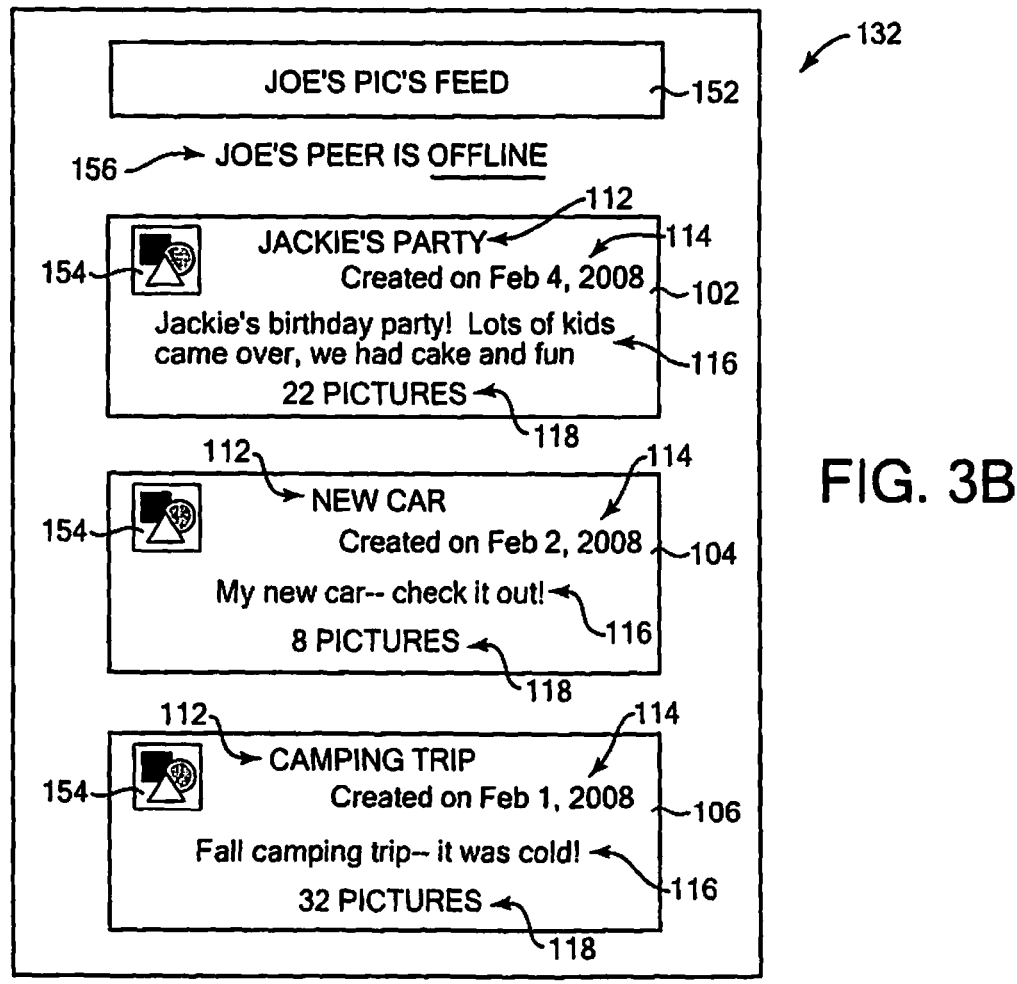

FIG. 3B is an example of a detailed view of album feed 132 of FIG. 3A displayed in the user interface 26, feed reader 28, or web browser 30. Feed 132 can include a title 152 for the overall feed similar to the title shown in the listing 130. The new content for the feed 132 is shown, including the new albums in the feed and their feed content elements 110 as shown in FIG. 2. For example, the album name 112, created timestamp 114, album caption 116, number of pictures 118 in the album are all displayed. The URL 120 in the feed as shown in FIG. 2 provides the link address to the full content referred to by the feed, and/or an address to display a thumbnail picture 154 (or the thumbnail 154 data is provided as feed content), that thumbnail providing a representation of the content of the album for which it is displayed.

In some embodiments, the thumbnail 154 for each album is a link which the user viewing the feed information can select to cause the full content to be retrieved from the peer 12 at the link address 120 and displayed to the user. In other embodiments, a link separate from the thumbnail 154, e.g., text or other designation, can be displayed.

When the feed is displayed in a user interface 26 or other viewer compatible with the online indicator feature, then the online/offline status of the peer serving the feed (and hosting the full content referred to by the feed) can also be displayed, e.g., as indicator 126. In this example, the peer is simply stated to be "online" or "offline". In other embodiments, other symbols or indicators can be used, such as a particular color or symbol. The address of a website on the peer 12 that can be accessed to view all of the user content can also be displayed, if such a website is available.

Similar detailed information can be displayed for other types of content.

Figure 4:
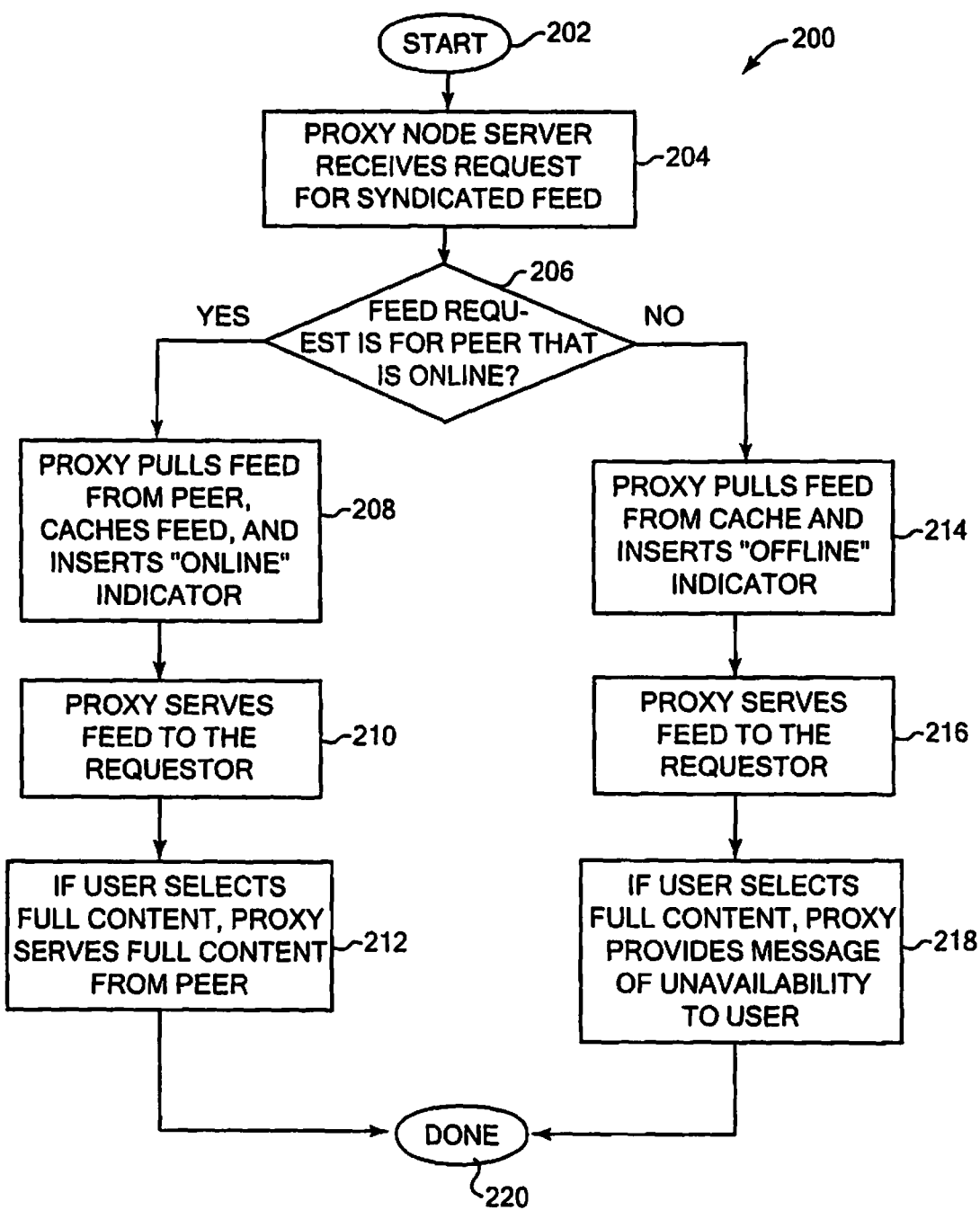
FIG. 4 is a flow diagram illustrating a method of the present invention for providing a feed from a peer to a requestor.

FIG. 4 is a flow diagram illustrating a method 200 of the present invention for providing a feed from a peer to a requestor. Method 200, and all the methods described herein, can be implemented, for example, using program instructions or code stored in a computer-readable medium, such as memory, hard disk, CD-ROM or DVD-ROM, or other medium, and performed by a computer device.

The method begins at 202, and in step 204, the proxy node server 14 receives a request for a syndicated feed from a particular peer 12 of the peer network. This request can be from user interface 26 or feed reader 28, i.e. a user that desires to see the syndicated feed. In embodiments that include the feed portal 20, the requestor can be the feed portal 20, which has requested the feed to store it in its database 22 after having been informed of the new feed by the feed manager 16 as described below in the embodiment of FIG. 5.

In step 206, the proxy node server 14 determines whether the feed request is a request for a feed from a peer that is currently online. The proxy node server 14 knows whether the peer 12 referenced by the feed request is currently online by simply checking whether that peer is currently connected to the proxy node server (the peers preferably have persistent connections to the proxy node server). If the requested peer is online, then the process continues to step 208, in which the proxy node server 14 requests and pulls the requested feed from the peer and caches the feed information in its proxy cache 18. The proxy node server 14 also inserts an "online" indicator into the feed. For example, the proxy node server 14 can parse the feed and insert the "online" indicator into the XML code downloaded from the peer. The online indicator can be any designator which will indicate to the user interface 26 of the peer owner software that the requested feed is provided from a peer that is currently online. The user interface 26 can read the indicator and display a peer status to the user showing the requested peer is online, such as online indicator 126 in FIG. 3. Since standard feed readers 28 or a standard web browser 30 do not have the capability of checking for this online designator, they are not typically able to indicate to the user of the readers 28 and browser 30 that a peer is online, unless enhanced with the functionality of the present invention.

In step 210, the proxy node server 14 serves the feed to the requestor, making it available to the requestor. Thus, the user interface 26, feed reader 28, or feed portal 20 can receive the feed information of FIG. 2. This allows the requestor to display to the user all the elements of the feed content, including a title of the feed, a subject of the feed, album titles, thumbnail images, online or offline indication, and/or other information similar to that indicated in FIGS. 2 and 3A-B.

After seeing the served feed, the user may select to see the full content from the peer (e.g., select a link or other control). If not, then step 212 is skipped, but if the user requests to see the full content as referred to by the served feed, then in step 212, the proxy node server 14 requests the full content from the appropriate online peer 12 and serves that content to the requestor. The proxy node server 14 can typically cache some of the full content, such as static content and images, in order to alleviate bandwidth constraints of the peer, but typically will not cache dynamic content that could change on the peer, and thus the proxy node server 14 will not be able to serve the full content from the cache 18. The process is then complete at 220. In the alternate embodiment in which a full content server is provided in (or alongside) the proxy node server 14, then the proxy node server can cache all the full content and serve it from the full content cache.

If the proxy node server 14 has determined that the requested peer is offline in step 206, then the process continues to step 214, in which the proxy node server 14 pulls the feed from its proxy cache 18 and inserts an "offline" indicator into the feed. Since the requested peer 12 is offline, the proxy server cannot retrieve the feed from the peer; however, if it has previously cached the feed when the peer was online (e.g., a previous iteration of step 212), then the proxy server stored the feed in its proxy cache and can pull the feed from there.

In some embodiments, if the feed was never previously served, then it will not be available in the proxy cache. However, in the embodiment of FIG. 1 in which a feed portal 20 is used, the feed portal 20 is notified when new feeds are published, and the proxy node server 14 is then notified and caches the new feed, so that a feed will always be available from the cache 18 (described with reference to FIG. 5). In alternate embodiments having no feed portal 20, the feed manager 16 of each feed-publishing peer 12 can force the proxy node server 14 to receive a copy of a new feed to store in its cache 18, e.g., when the feed is published, even if the feed is not being served to any requestor, so that the feed will always be available in the cache.

Similar to the "online" indicator of step 208, the "offline" indicator can be any designator which will indicate to the user interface 26 of the peer owner software that the requested feed is provided from a peer that is currently offline. The user interface 26 can read this designator when receiving the feed and display an indication to the user that the requested peer is offline. Since standard feed readers 28 or web browser 30 do not have the capability of checking for this offline designator, they are not able to indicate to the user of the readers 28 and browser 30 that a peer is offline, unless so enhanced.

In step 216, the proxy node server 14 serves the cached feed to the requestor, making it available to the requestor. Thus, the user interface 26, feed reader 28, or feed portal 20 can receive the feed information, similar to step 210 described above.

After seeing the served feed of step 216, the user may select to see the full content from the peer, even if an "offline" indicator is displayed. If not, step 218 is skipped, but if the user does request the full content, then in step 218, the proxy node server 14 provides a message to the user that the full content is unavailable. This is because the peer which stores the full content is offline and not accessible (the proxy node server 14 may be able to cache some of the full content, such as static content and images as described above, but not the dynamic parts of the full content, and thus cannot serve the full content from the cache 18). In the alternate embodiment mentioned above, the proxy node server 14 can cache all of the full content as well as feed content, allowing the full content to be served to a requestor by the proxy node server 14 even when the publishing peer 12 is offline.

The process is then complete at 220.

The present invention allows a feed to always be retrieved and the feed's contents viewed by a user from a peer in a peer network, even when the peer that serves the feed is currently offline. This is because the proxy node server 14 can cache the feed content so that it is available at any time. Furthermore, the use of the proxy node server allows an indicator such as an online or offline status indicator for the peer to be inserted in the feed, which gives the user additional information not normally available to users accessing feeds. By seeing the online or offline status of the peer, the user knows in advance whether the full content from the peer will be available for viewing or not.

If a requestor accesses the feed portal 20 (e.g., using a web browser 30), then the feed portal 20 can be included in the above-described method 200. For example, the feed portal 20 can send the request to the proxy node server 14, which would perform the steps as indicated above (including inserting online/offline indicator), except that instead of the proxy node server serving the requested feed to the end-user requestor, the feed portal 20 pulls the feed from the proxy node server 14 and serves it to the user. Feeds received from the proxy node server by the portal 20 can be cached in the database 22.

Figure 5:
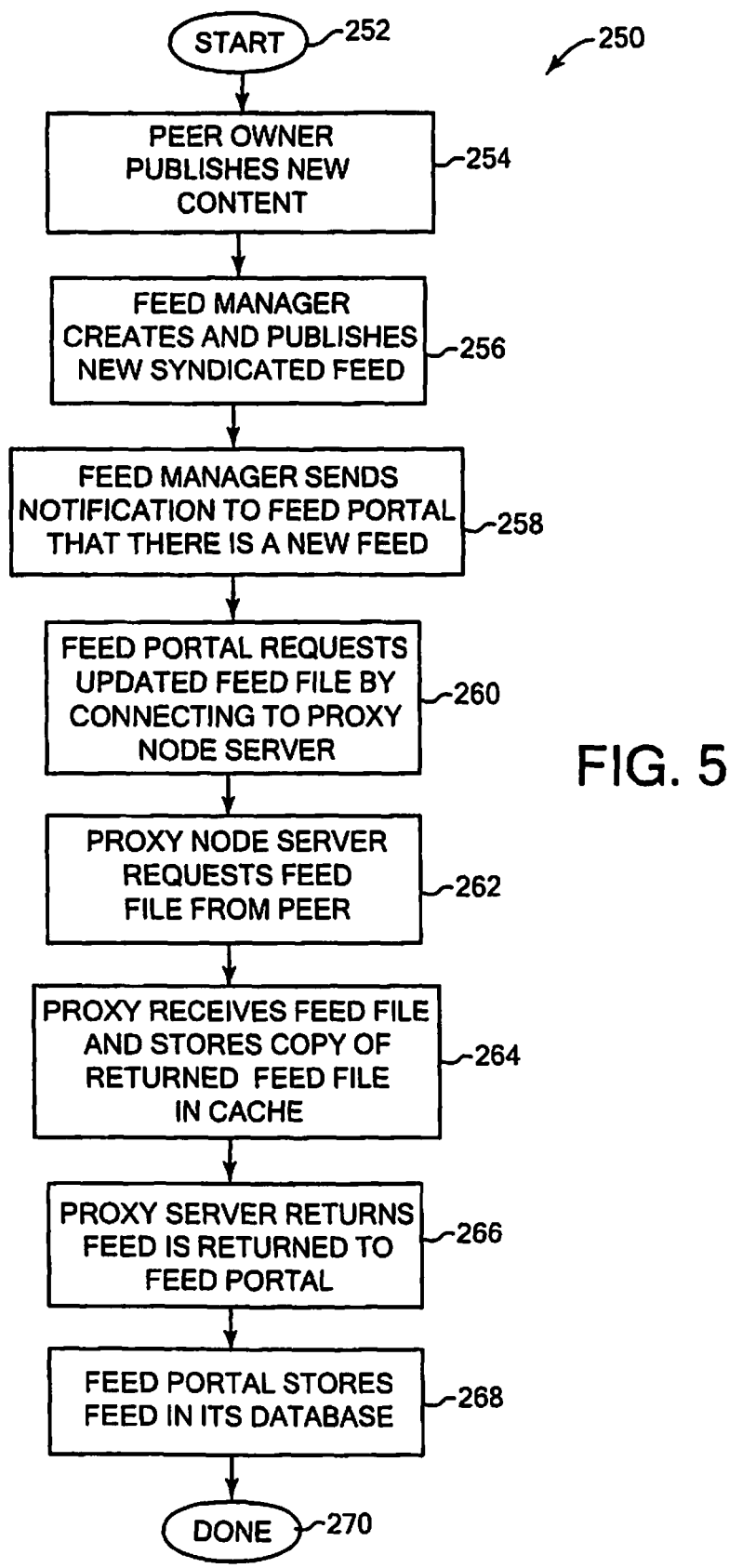
FIG. 5 is a flow diagram illustrating one embodiment of a method of the present invention for generating and providing feeds for the proxy node server and the feed portal.

FIG. 5 is a flow diagram illustrating one embodiment of a method of the present invention for generating and providing feeds for the proxy node server 14 and the feed portal 20 so that users may access the feeds. In this method, the feed portal 20 is used to serve peer feeds and to help notify the proxy node server 14 of new content that has been published by a peer.

The method starts at 252, and in step 254, the peer owner of peer 12 publishes new content, such as a new picture album, written content, or other type of content on the peer 12, which was not previously available from that peer. For example, the user can designate the new content as available to the public over the internet or through feeds, e.g., by putting the new content in a particular directory or location on the peer. In step 256, the feed manager 16 of that peer 12 creates and publishes a new syndicated feed that references the new content. The new syndicated feed is thus available to be read by other users. In step 258, the feed manager 16 sends a notification to the feed portal 20 that there is a new feed with new content available from peer 12. This notification identifies the peer to the feed portal 20. The peer 12 can notify the portal 20 via the proxy node server 14 when the portal 20 is external to the peer network 11; alternatively, if the portal 20 is within the peer network 11, the peer 12 can notify the portal 20 directly. In step 260, the feed portal 20 connects to the proxy node server 14 and requests the new feed file.

In step 262, the proxy node server 14 requests the new feed file from the peer 12 based on the request the proxy server received from the feed portal 20. In step 264, the proxy node server 14 receives the new feed file from the peer 12 and stores a copy of the returned feed file in its proxy cache 18. Thus the proxy cache 18 will store the latest, newest content feed from each particular peer 12 that has notified the feed portal 20 of new content. In step 266, the proxy server 14 returns the feed to the feed portal 20, and in step 268, the feed portal 20 stores the feed in its database 22 so that it, like proxy server 14, will have the latest feeds cached. Thus, when a user accesses the feed portal 20 (e.g., using web browser 30) and requests this feed, the feed portal 20 can serve the feed to the user from its database 22. The process is then complete at 270.

If the user of a web browser 30 wishes to receive and view the full content that is referred to and summarized by the received feed, then the browser 30 requests the portal 20 for the full content, the portal 20 requests and receives this full content from the peer 12 that served the feed, and the portal 20 serves the full content to the web browser 30. If the peer 12 is offline, the portal 20 will not be able to serve the full content. In some embodiments the portal can provide the peer online or offline status to the web browser 30 by requesting and examining a feed from the proxy node server 14, which has inserted an online/offline indicator in the feed as described above (or the portal 20 can otherwise receive an online/offline indicator from the proxy node server). In an embodiment where the peer 12 can push full content to the portal 20, the portal 20 can serve the full content from its cache (e.g., see FIGS. 6 and 7B, and this can also be implemented when using a proxy node server 14).

In an alternate embodiment, the proxy node server 14 can be notified of new content feeds by the feed manager 16 rather than feed portal 20. In yet another embodiment, the proxy node server 14 can periodically poll the peer 12 for new content feeds, rather than waiting for a request or notification from the feed manager 16 and/or feed portal 20.

FIG. 6 is a block diagram illustrating another embodiment of the present invention. FIG. 6 illustrates a system in which a proxy node server 14 is not used, and user computer devices can directly provide feeds to a feed portal.

System 300 includes a portal network site or feed portal 302, which is a central network site or web site that collects and aggregates feeds and other information from various sources over the Internet and World Wide Web, and allows users connecting to the feed portal 302 to access that content, similar to the feed portal 20 as described above with reference to FIG. 1. The portal 302 can access a database 304 which can store content or other information required by the portal 302, similar to database 22 described above.

Portal 302 (or portal 20 of FIG. 1) can aggregate a number of web feeds over the Internet, including feeds from other websites 306, such as feeds from websites that store user content that has been uploaded to those websites. For example, a site 306 can be the web location (URL) of a weblog or other user-created content, and this location can be a dedicated domain, a sub-domain, or embedded within a web site 306.

According to the present invention, portal 302 also can aggregate web feeds from end-user systems 308 of users 310.

Systems 308 can be considered the same as "peers" like peers 12 as described above, and thus the network connectivity between the systems 308 is considered a peer-to-peer network similar to network 11 since none of the systems 308 acts as a dedicated server; in this embodiment, however, no proxy node server 14 is used to facilitate communication between the systems 308 within a peer-to-peer network. The end-user systems 308 are systems that are typically used and/or maintained by users 310, and can store content originating from the users 310. Like any peers, content can be shared via applications that run on the end-user systems 308 and are connected via a communication link to the Internet (or other network). Systems 308 can be any suitable computer or electronic device which can communicate across computer networks, similar to peers 12. As an example, system 308a is a cell phone, system 308b is a PDA, and system 308c is a desktop computer. In the typical embodiment, an operating system runs on each end-user system 308, and one or more application programs and driver programs run alongside or under the operating system, as is well known to those of skill in the art.

Each of the systems 308 is capable of hosting content, similar to peers 12, i.e., the content can include images and video on cell phones, electronic photo albums on a desktop photo sharing application, a word document shared from a laptop using a point-to-point (P2P) application, music files stored on a PDA, etc. Each system 308 can run applications that update the portal 302 with end-user content using a syndicated feed mechanism. The portal 302 captures this content and makes it available to any user accessing the portal 302 over the Internet.

The feed portal 302 can provide content over the Internet or other network to users 22 (content consumers) who access the portal 302 (or who have setup preferences or settings to read content from portal 302) from computers 311, which can be any device capable of accessing portal 302 over the network. Users 312 can access the portal 302 via the Internet or other network using any type of computer device, including those systems 308 described above for users providing content. The users 312 can use interface and software tools provided by the portal 302 to search, view, and/or organize the content to a desired degree.

Figure 7A:
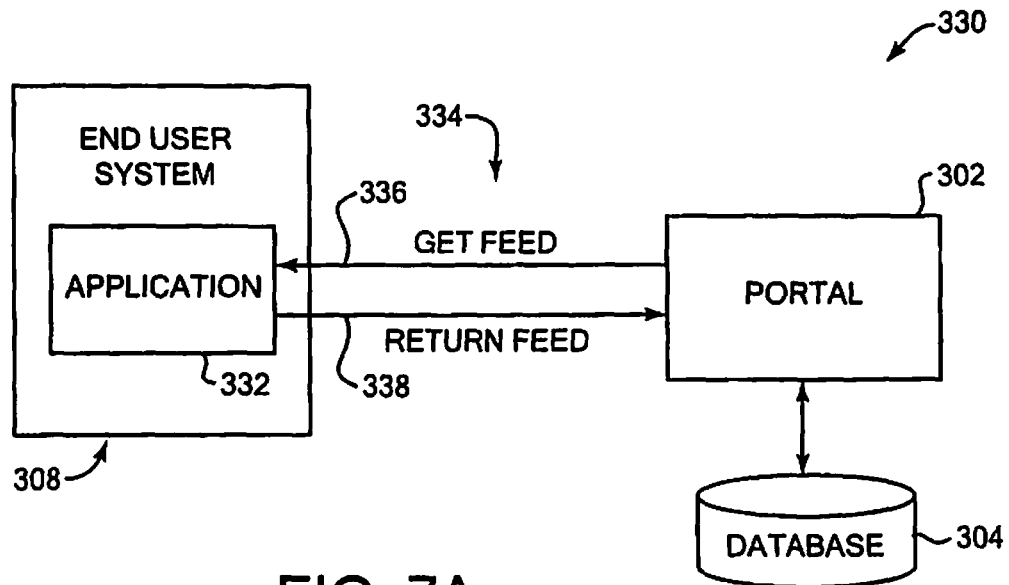
FIGS. 7A and 7B are block diagrams illustrating embodiments of the present invention, in which feeds are used to provide end-user content to the web portal and in which feeds are pushed to the portal.

FIG. 7A is a diagrammatic illustration of one embodiment 330 of the present invention, in which feeds are used to provide end-user content to the web portal.

An end-user system 308 includes an application 332 that is operable to provide syndication web feeds to a website via a connection over the Internet or other network. In the described embodiment, the web feeds are in XML format, but can be provided in other formats or languages in other embodiments.

To establish a feed to the portal 302 over a network, the system 308 can provide the feed information to the portal 302. As described above, there can be two types of feeds that are accepted by the portal 302: a feed in a widely-used Internet-based XML syndication format, such as RSS and ATOM; and a feed in a proprietary XML format which supports "rich media" content. Feeds in both types of XML formats can provide a link back to the full media content stored on the system 308.

When the end-user system application 332 is accessible over a network 334, e.g., when the application 332 can accept an HTTP (Hypertext Transfer Protocol) connection in an Internet embodiment, then the end-user system 308 running that application 332 can be polled by the portal 302 to determine if there is new user content to syndicate. This polling is represented in FIG. 7A by arrow 336, where the portal 302 sends a request for the feed. For example, the portal 302 can poll the end-user system 308 periodically, such as every several hours, or some other time period as set by the portal 302 administrator, or as set by the user 310 of the end-user system 308. Alternatively, the polling can be performed at irregular time periods, as triggered by other events or conditions, e.g., whenever the user system 308 connects to the portal 302, or whenever a request for a feed from that user's system 308 is received from a different user.

The polling request 336 is received by the application 332 and, if it is able and permitted to do so (based on settings, user preferences, etc.), the application 332 responds by sending a return feed represented by arrow 338. The return feed 338 includes feed content that describes or summarizes the full published content of the user system 308, e.g., in text or HTML, wrapped in an XML format to create a feed. The feed content also can include a link back to the referred full content on the system 308. Thus, polling can be used to allow portal 302 to initially get feeds for content, and also to get updates of feeds for new and updated content. If there is no new content on the user system 308 since the last poll from the portal 302, then the application can indicate that there is no new content in the return feed 338. The application 332 supports the feed syndication format used in the request by the portal 302.

As described above with reference to FIG. 4, an online or offline indicator can be inserted in the feed by a proxy node server 14 (if present), and the portal 20 or 302 can pull this feed from the proxy node server 14. This indicator indicates whether the system 308 providing the feed/full content is currently online or not, and thus showing whether the full content can be currently accessed and viewed from that system.

When a user of the portal 302 receives a feed, it can be displayed as shown above in FIGS. 3A and 3B. If a link or other control is selected to display the full content summarized by the feed, then the portal 302 requests the full content from the end-user system 308 that provided the feed, and serves that full content to the requestor (if that system 308 is online).

Figure 7B:
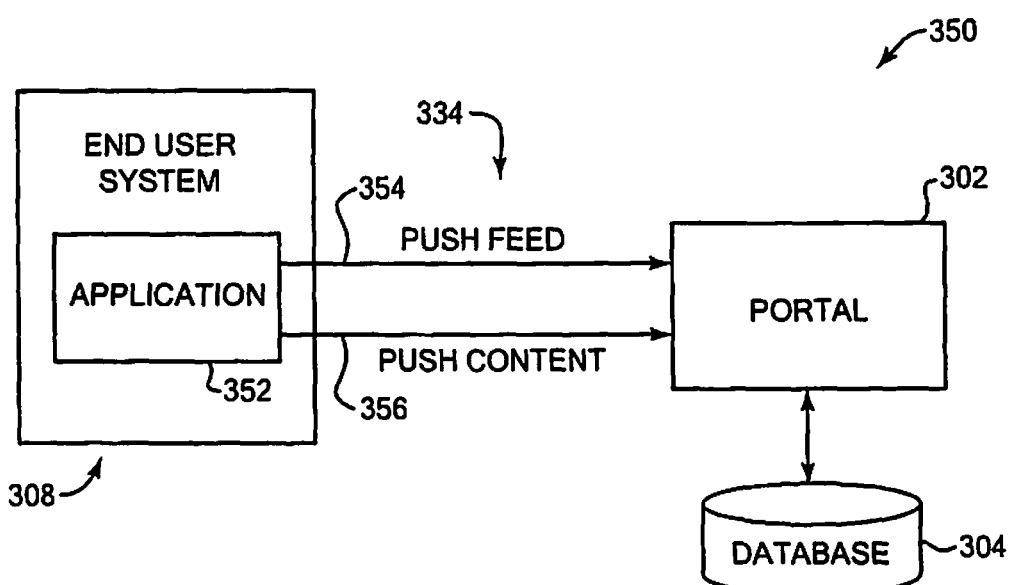

FIG. 7B is a diagrammatic illustration of another embodiment 350 of the present invention, in which web feeds are pushed to the portal 302. An end-user system 308 includes an application 352 that is operable to provide syndication web feeds or content to a website via a connection over the Internet or other network. In the described embodiment, the web feeds are in XML format, but can be provided in other formats or languages in other embodiments.

In this embodiment, portal 302 supports a web-services-based Application Program Interface (API) which can be used by end-user systems 308 to push a feed into the portal 302, rather than waiting for the portal 302 to poll the system 308. This embodiment is particularly useful to end-user systems which are not addressable over the Internet or other network due any of a variety of reasons, including routing or other network connectivity issues, lack of static Internet Protocol (IP) addresses for the system 308, the application 352 cannot support an inbound HTTP connection, etc.

The web-services API of the portal 302 can support two different methods of receiving feeds pushed by the system 308. In one method, only the web feed itself is pushed by the application 352 to the portal 302. This is indicated by arrow 354 in FIG. 7B. This is similar to the embodiment of FIG. 7A, where the feed describes and summarizes the new content of the user system 308, e.g., in text or HTML, and provides a link back to the full content on the system 308. However, the portal 302 does not poll the system 308 for this feed; rather, the system 308 pushes the feed to the portal 302 when determined appropriate by the system 308. For example, the feed can be pushed periodically at a predetermined time interval, or can be pushed when the user indicates, or when one or more predetermined events or conditions occurs. As described above, in some embodiments a proxy node server 14 can insert an online or offline indicator in a feed and that feed can be received from the proxy node server 14 by portal 20 or 302.

In another method, the application 352 pushes the web feed and also pushes the full content to the portal 302, shown by arrow 356. The portal 302 can cache the received full content for a predetermined period of time, as determined by a user or administrator, before deleting it and having to retrieve it again from system 308. Thus, when both the feed content and the full content are pushed into the portal 302, the end-user system 308 is not involved in serving the content to the content consumer (user 312) on the portal 302, and it is irrelevant whether the system 308 is online or offline; instead, the portal 302 serves the feed content and the full content from its cache. No online or offline indicator need be inserted in this embodiment, since the online status of the system 308 that provided the content is not relevant.

The application 352 can both produce a standard syndication web feed (such as an XML feed) and accept incoming HTTP connections, or be integrated and compatible with the web-services API of portal 302 in order to push content to the portal. For example, a desktop-based photo sharing application, residing on a desktop computer system 308 and which shares content over the web, could produce a new RSS feed which is accessible over HTTP, and accept incoming HTTP connections from portal 302. In a different example, a cell phone that does not have a constant high speed connection, or cannot accept a HTTP connection, can push the feed and the content to the portal 302 whenever new content is published by the user, i.e., created and intended to be distributed publicly.

When a user of the portal 302 receives a feed, it can be displayed as shown above in FIGS. 3A and 3B (content can be considered "new" if it was identified as new in the last poll of the system 308 by the portal 302, or the last push of feed and/or content by the system 308 to the portal 302. Or, content can be identified as "new" if it has not yet been viewed by the particular user viewing the listing 380). If a link or other control is selected to display the full content referenced by the feed, then the operation depends on the embodiment used. In the case of an end-user system application that can accept an inbound network connection, the feed control will take the user to the end-user system 308 to display the content stored on that system. If an end-user system cannot accept a network connection and that system has pushed the content to the portal, then the portal can intercept the link to the rest of the content from the feed and redirect the connection back to the portal cache which can then serve the full content.

It should be noted that some applications 332 or 352 can include the functionality to both host a feed as in FIG. 7A or to push a feed and full content as in FIG. 7B, while other application embodiments may support only some of this functionality.

Figure 8:
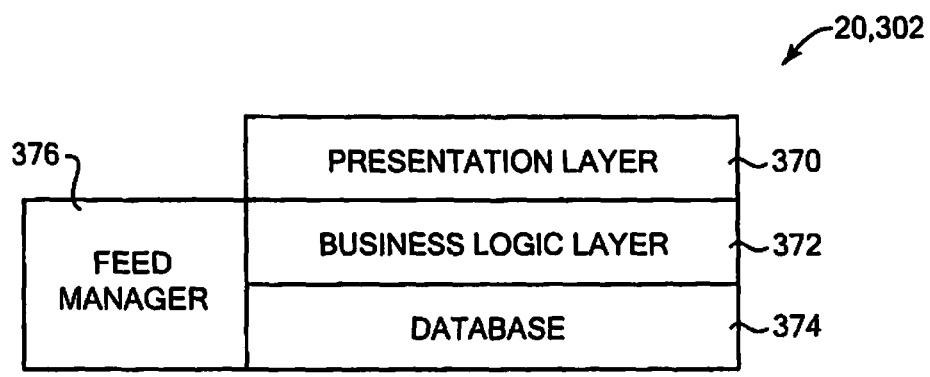
FIG. 8 is a block diagram illustrating an example of a web feed portal suitable for use with the above-described embodiments.

FIG. 8 is a block diagram illustrating an example of a web feed portal 20 or 302 suitable for use with the above-described embodiments. Portal 302 can use a tiered architecture including a presentation layer 370, a business logic layer 372, a data layer 374, and a portal feed manager 376.

Presentation layer 370 is responsible for presenting a web based user interface to web portal guests, i.e., users 312. The user interface can include standard features, including links, search functions, filtering, etc. Included in the user interface is the ability to allow a content consumer to select one or more web feeds to receive information from those feeds. As shown in FIGS. 1 and 6, these feeds can include feeds from peers 12, other websites 316 over a network, and/or feeds from end-user systems 308.

Business logic layer 72 includes all the logic required to manage the functionality of the portal, such as an account creation function, searching function, and browse feeds function which allow content consumers to create accounts in order to manage, search, browse, and read end-user system syndication feeds. The logic is typically implemented in software running on the server or system running the portal 20 or 302 and is in communication with the presentation layer 370 to allow a user to access its implemented features, and is in communication with data layer 374 to access and store data. Data layer 374 is the database 22 or 304 as shown in FIG. 1 or 6, and stores user accounts, feeds, content (e.g., if content is pushed to the portal), and user and/or administrator preferences for portal functionality. For example, the various feeds from peers 12 or user systems 308 and the content caches as well as content consumer account information can be stored in data layer 374.

Portal feed manager 376 manages the acquiring of feeds from the feed manager 16 of peers 12, or from the end-user system applications 332 or 352, as described above. Thus layer 376 includes the functionality to poll peer or registered end-user system syndication feeds for new content, accept feed pushes from peers 12 or end-user systems 308, and accept content pushes from end-user systems. Layer 376 can include the web-services API described above that used to receive pushed feeds and content from systems 308. The feed manager interfaces with the business logic and data layers, but does not need to be presented at the presentation layer 370.

In one embodiment, a web feed can be registered with the portal 20 or 302, which allows the feed to be polled by the portal 20 or 302 (if appropriate) and accessed by users of the portal. For example, there can be two ways to register a feed with the portal. In one way, the network address (e.g., Uniform Resource Locator (URL)) for the syndication feed is registered with the portal by a user with appropriate access, e.g., a user who is registered on the portal (described below). After such registration, the feed address will be polled for new user content. This method of feed registration is applicable, for example, for an end-user system 308 that can accept network connections and can serve an address such as a URL for syndication feeds.

In another way to register a feed, the user/owner of an end-user system 308 registers with the portal 302 and is given a unique identification. That user can then use the identification when configuring his feed push to the portal 302 over a web services API. This method of feed registration can be applicable for an end-user system 308 that cannot accept a network connection and pushes content and/or feeds to the web portal 302.

In one embodiment, the portal 20 or 302 can include two sections or sets of functions, one for registered users and the other for unregistered users. Unregistered users accessing the portal 20 or 302, for example, can be permitted the following actions: search the available web feeds using a particular keyword or set of keywords (phrase); view the details and content of a web feed; rank feeds by most popularly subscribed or visited; view a list of the newest feeds; and register with the portal 20 or 302 to open up registered user features, as described below.

To become registered, users of the portal 20 or 302 can perform validation or registration actions, e.g., register their email addresses, password, and basic demographic information. Upon doing so, a registered user is permitted to access the following functionality of the portal 20 or 302 in addition to the above-described functionality available to unregistered users: build a list of favorite feeds which is stored by the portal 20 or 302 for later access by the registered user; specify the address (URL) of a feed to be added to the portal 20 or 302, such as a feed to content owned by the registered user, or owned by a different user; save a feed entry in a "clippings" area for later viewing after the original feed may be unavailable; notifications of new feed content from the registered user's favorite feeds listing using a function or application such as email, a cell phone text messaging system (e.g., Short Message Service (SMS)), or a desktop alert tool.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for distributing a syndicated feed from peer devices in a peer-to-peer network, the method comprising:
   receiving a notification at a feed portal that a new syndicated feed has been generated on a peer device in the peer-to-peer network;
   requesting, by the feed portal, the data for the new syndicated feed from a proxy server that is connected to the peer device in the peer-to-peer network;
   receiving the new syndicated feed at the feed portal from the proxy server and storing the new syndicated feed in a database associated with the feed portal;
   serving the new syndicated feed from the database upon a first request by a requestor connecting to the feed portal over a network other than the peer-to-peer network, the new syndicated feed including an online or an offline status indicator of the peer device, wherein the requestor is a feed reader provided on a device that communicates with the feed portal over the network other than the peer-to-peer network;
   receiving a second request from the requestor for full content referenced by the new syndicated feed; and
   serving the full content from the peer device only if the peer device is currently online consistent with the online status indicator of the device, otherwise providing a message of unavailability of the peer device to the requestor consistent with the offline status indicator of the peer device.

2. The method of claim 1 wherein the notification is received at the feed portal from the peer device generating the new feed.

3. The method of claim 1 wherein the requestor is a web browser.

4. The method of claim 1 further comprising searching feeds from a plurality of peer devices on the peer-to-peer network based on search criteria provided by a user.

5. The method of claim 1 wherein the peer device generates a new feed when new content is published from the user of the peer device.

* * * * *